United States Patent
Breck et al.

(10) Patent No.: US 6,548,572 B1
(45) Date of Patent: Apr. 15, 2003

(54) SURFACE PRINTING INKS AND COATINGS FOR USE

(75) Inventors: Alan Keith Breck, Kingston (CA); Michael A. Davids, Brampton (CA)

(73) Assignees: DuPont Canada Inc., Mississauga (CA); Sun Chemical Limited, Fort Lee, NJ (US)

( * ) Notice: Subject to any disclaimer, the term of this patent is extended or adjusted under 35 U.S.C. 154(b) by 0 days.

(21) Appl. No.: 09/456,268

(22) Filed: Dec. 7, 1999

(51) Int. Cl.$^7$ ............................................. C08K 3/00
(52) U.S. Cl. ................. 523/160; 523/161; 524/538; 524/540; 524/606
(58) Field of Search ................. 523/160, 161; 524/538, 540, 606

(56) References Cited

U.S. PATENT DOCUMENTS

| | | |
|---|---|---|
| 4,321,185 A | 3/1982 | Benitez |
| 4,424,260 A | 1/1984 | Pupp |
| 4,461,667 A | 7/1984 | Pupp |
| 4,495,016 A | 1/1985 | Viberg et al. |
| 4,503,102 A | 3/1985 | Mollison |
| 4,521,437 A | 6/1985 | Storms |
| 5,272,236 A | 12/1993 | Lai et al. |
| 5,278,272 A | 1/1994 | Lai et al. |
| 5,288,531 A | 2/1994 | Falla et al. |
| 5,338,785 A | 8/1994 | Catena et al. |
| 5,360,648 A | 11/1994 | Falla et al. |
| 5,364,486 A | 11/1994 | Falla et al. |
| 5,508,051 A | 4/1996 | Falla et al. |
| 5,531,060 A | 7/1996 | Fayet et al. |
| 5,635,011 A | 6/1997 | Rosen |
| 5,658,968 A | 8/1997 | Catena et al. |
| 5,721,025 A | 2/1998 | Falla et al. |
| 5,747,594 A | 5/1998 | de Groot et al. |
| 5,792,534 A | 8/1998 | de Groot et al. |
| 5,879,768 A | 3/1999 | Falla et al. |

FOREIGN PATENT DOCUMENTS

| | | |
|---|---|---|
| EP | 673397 | 12/1999 |
| WO | WO 99/10430 | 3/1999 |

*Primary Examiner*—Edward J. Cain

(57) ABSTRACT

This invention relates to non-aqueous coating and ink formulations for use on flexible film or paper packages for food, which require aseptic packaging conditions. The printed and coated packaging materials, and methods of aseptic packaging, as well as the aseptic packages are also disclosed. The coating formulation comprises the following components: 1) a mixing varnish comprising a phenolic-modified co-solvent-type polyamide resin, 2) a nitrocellulose compound varnish, 3) a non-aqueous solvent mixture, and 4) specialty additives, and wherein all components present in the formulation are stable in the presence of an oxidizing agent. The ink formulation comprises the following components: 1) a mixing varnish comprising a phenolic-modified co-solvent-type polyamide resin, 2) a nitrocellulose compound varnish, 3) a non-aqueous solvent mixture, 4) a non-aqueous solution of a metal salt of propionic acid and 5) specialty additives, and wherein all components present in the formulation are stable in the presence of an oxidizing agent.

6 Claims, 1 Drawing Sheet

SURFACE PRINTING INKS AND COATINGS FOR USE

FIELD OF THE INVENTION

This invention relates to non-aqueous coating and ink formulations for use on flexible film or paper packages for food, which require aseptic packaging conditions. Printed and coated packaging materials, and methods of aseptic packaging, as well as the aseptic packages are also disclosed.

DESCRIPTION OF THE PRIOR ART

Foods are generally packaged in portion sizes, which may be single serving portions or multiple serving portions. Disposable packaging is used extensively in all areas of the food industry. The ability to print information directly on such packages offers cost savings, but the packaging processes to which the materials must be subjected are demanding. Typically foods such as milk and juice require packaging under aseptic or sterile conditions, which means that any coatings and/or printing inks used to label such packaging must also endure such conditions. The main product packaging materials comprise flexible films, such as polyethylene alone or in combination with other polymer resins. However, paper-based laminated packaging materials usually comprising paper, polyethylene and aluminum foil are also employed.

Examples of paper-based laminated packaging materials are well known in the art, and include, for example the materials disclosed in U.S. Pat. No. 5,635,011 issued Jun. 3, 1997 to Rosen; U.S. Pat. No. 5,531,060 issued Jul. 2, 1996 to Fayet et al; U.S. Pat. No. 4,495,016 issued Jan. 28, 1985 to Viberg et al; U.S. Pat. No. 4,461,667 issued Jul. 24, 1984 to Pupp; and U.S. Pat. No. 4,424,260 issued Jan. 3, 1994 to Pupp.

Examples of flexible film packaging, heat-sealable polymeric films are typically fabricated into disposable packages for containing flowable materials including for example liquids such as milk, fruit juices and the like. The preferred form of package is a pillow-shaped pouch that is often manufactured on a vertical form, fill and seal apparatus with the flowable material being placed in the pouch as part of its manufacture. It is often the practice to place multiples of such pouches into larger bags upon which product information may be printed. In such instance, the larger bag is not in direct contact with the food that is packaged and as a result the ink requirements are substantially different from those where the pouch itself contains printed matter about product contents and the printed film is in contact with the food.

Thus, where a food product is to be packaged and sterilized, the film used to make the pouch or package for such product must also be sterilized. In addition, the printed film must be capable of not only withstanding the aseptic packaging conditions required for sterilized food products, but also must be capable of withstanding the rigours of manufacture, transport, storage and handling from packaging to the point of sale. These requirements also apply to products that are not sterilized but are subjected to aseptic packaging conditions.

The requirements for an ink for applying to the surface of polymer films are very much dependent on the manufacturing conditions and the product being packaged. The printed film must endure any converting operations, such as printing, laminating, coating, and slitting into rolls of correct width. Previously, in order to produce printed packages that would be capable of sterilization in, for example, a solution of hot hydrogen peroxide, an extra layer of film was applied via a lamination step to cover and protect the surface of the printed film.

The inks and coatings for use with aseptic packaging materials, in particular film pouches must meet a number of different requirements and hence the development of suitable formulations has posed a challenge. For example the peroxide used to sterilize printed film can cause the ink to debond from the polymer surface, dissolve, fade or bleed so that the graphic image on the pouch deteriorates unacceptably. Components in the ink may cause the peroxide sterilant to decompose at an accelerated rate that will shorten its useable life and may pose a serious safety hazard if the containing vessel is not well vented.

Most ink systems, whether solvent-based or water-based, are not suited for printed films which are sterilized in hot peroxide. A number of criteria for identifying suitable ink systems are as follows. The printed films must have the following properties: scuff-resistance; bleed-resistance and colourfastness in the presence of hot hydrogen peroxide solutions; safe for packaging liquid foods like milk, juice and water over a lifetime of ingestion of the fluid product; and non-reactive with hot hydrogen peroxide solution nor catalyze its decomposition reaction.

A wide variety of flexible packaging printing inks and coatings has been proposed in the patent literature and are available commercially. Typically, these inks are printed by rotary letter press printing using flexible rubber plates or by gravure printing using engraved chrome plated cylinders on a wide variety of substrates including plastic films selected from polyolefins, polyesters, polystyrene, cellophane, cellulose acetate and the like. See, for example, U.S. Pat. No. 5,338,785 issued Aug. 16, 1994 to Catena, et al.; U.S. Pat. No. 5,658,968 issued Aug. 19, 1997 to Catena, et al.; and U.S. Pat. No. 4,321,185 to Benitez issued Mar. 23, 1982.

Coating and ink formulations for printing on paper-based laminated aseptic packaging materials are also known. This type of packaging material is sold commercially by Tetra Pak International AB and by Combibloc Inc. An example of a package made from such material is a carton that may be a reclosable aseptic carton. Normally the carton is pre-sterilized and milk after being subjected to an ultra-high temperature (UHT) process is placed in the carton and then hermetically sealed to prevent any contamination.

Typically the laminated packages or cartons are composed of three materials: paper (70%), polyethylene (24%) and aluminum foil (6%). The paper provides stiffness, strength and the block shape. The polyethylene used on the innermost layer seals the package. The aluminum foil provides light and oxygen barrier. A protective polyethylene coating on the exterior keeps the carton dry and covers the printed surface. This coating may be laminated or extrusion coated. The printing of the carton surface may be by roto-flexo printing which requires a laminating and cutting step after the printing.

Examples of paper-based laminated packaging materials can be found in the patent literature. These materials are used to produce aseptic packages. Examples of typical materials are disclosed in U.S. Pat. No. 4,424,260 issued Jan. 3, 1984 to Pupp; U.S. Pat. No. 4,416,667 issued Jul. 24, 1984 to Pupp and U.S. Pat. No. 4,495,016 issued Jan. 22, 1985 to Viberg et al. The last patent references a printed layer but the structure of the packaging material and the process does not involve exposing the printed layer to the sterilizing conditions used in the packaging operation. The process is rendered more complicated because this must be avoided.

SUMMARY OF THE INVENTION

An important aspect of the ink and coating formulations of the present invention is that while polyamide resins, and co-solvent type polyamide resins have previously been incorporated as base varnishes in ink and coating systems, no one has previously recognized the necessity for incorporating such resins with high functionality conducive to good oxidizing conditions, in particular $H_2O_2$. While manufacturers of such polyamide resins make suggestions as to how their products should be employed, these suggestions are merely starting points and do not provide instructions, which can be carried out on a routine basis to formulate a suitable ink or coating formulation. It has been found that the particular combination of components proposed for the present ink or coating formulation of the present invention allows the production of a surface printed or coated film or paper-based packaging material, which may be subjected to the conditions that exist in a typical aseptic food packaging operation. Such conditions are quite severe and normally result in the degradation of the ink or coating on the surface of the package.

The present invention offers ink and coating formulations that may be applied to any film layer or other laminate packaging layer regardless of whether the material is exposed to sterile packaging conditions. Unlike the prior art formulations, there is no need for a protective covering layer for the coated or printed surface of the packaging material.

In one aspect, the present invention provides a non-aqueous coating formulation compatible with aseptic packaging processes which comprises the following components:

1) a mixing varnish comprising a phenolic-modified co-solvent-type polyamide resin,
2) a nitrocellulose compound varnish,
3) a non-aqueous solvent mixture, and
4) specialty additives, and wherein all components present in the formulation are stable in the presence of an oxidizing agent.

In another aspect of the invention, there is provided an ink formulation compatible with aseptic packaging processes which comprises the following components:

1) a mixing varnish comprising a phenolic-modified co-solvent-type polyamide resin,
2) a nitrocellulose compound varnish,
3) a solvent mixture,
4) a non-aqueous solution of a metal salt of propionic acid and
5) specialty additives, and wherein all components present in the formulation are stable in the presence of an oxidizing agent.

In yet another aspect of the invention, there is provided a process for manufacturing a coating formulation that is stable when applied to a packaging material surface and remains so when the film is used to package food products under aseptic packaging conditions, which comprises the steps of dissolving at least one phenolic-modified, co-solvent-type polyamide resin in at least one non-aqueous solvent, and when required combining the above mixture with the following additional components: at least one synthetic wax, at least one slip release agent, at least one nitrocellulose, and one or more specialty additives selected from plasticizers and adhesion promoters.

In another aspect, the invention provides a process for manufacturing an ink formulation that is stable when applied to a packaging material surface and remains so when the material is used to package food products under aseptic packaging conditions, which comprises the steps of dissolving at least one phenolic-modified co-solvent type polyamide resin in at least one non-aqueous solvent, combining the above mixture with a nitrocellulose, at least one pigment and a non-aqueous solution of a metal salt of propionic acid, and when required with at least one synthetic wax, at least one slip release agent, and one or more specialty additives selected from plasticizers and adhesion promoters.

The invention also provides a process for producing a flexible packaging film, a surface of which is printed which film is for use in the manufacture of aseptically packaged food products which comprises the steps of forming a flexible film from at least one resin or one or more film layers made from resin selected from ethylene polymers, polyester polymers, ethylene-vinyl acetate polymers, ethylene vinyl hydroxy polymers and nylon polymers alone or in combination; and applying the ink formulation as defined above to the surface of the film in a desired pattern.

Preferably, the film prior to application of the ink is treated to improve its wettability. The printed film is preferably coated with a clear coating after printing.

In another aspect, there is provided a process for producing a paper-based laminated packaging material a surface of which is printed, which material is for use in the manufacture of aseptically packaged food products, which process comprises the steps of forming a paper-based laminated packaging material and applying to an exterior surface thereof, indicia using the ink formulation as described above.

The printed packaging material may also be coated with a clear coating after printing, which coating is preferably the coating formulation of the present invention.

In yet another aspect, there is provided an aseptic food packaging process comprising the steps of printing the surface of a flexible packaging film with at least one printing ink having the formulation as described above, subjecting the printed, flexible packaging film to a sterilization process for food contact packaging comprising passing the sterilized, printed, flexible film into a sterile zone where a package is formed, filled with a food product, hermetically sealed and cut, and discharging the sealed and packaged food product. The food product may be sterilized.

In another aspect of the invention, there is provided a food packaging process wherein the packaging material comprises a paper-based laminated packaging material that has an exterior printed surface, which process comprises subjecting the printed packaging material to aseptic food packaging conditions wherein a package is constructed from pre-printed paper-based laminated packaging material and the process includes passing the printed material through a sterile zone wherein the food is placed in the package and the package is hermetically sealed.

DETAILED DESCRIPTION OF THE INVENTION

Preferably, the present invention provides a coating formulation as set out above wherein component 1) is present in the formulation in the amount of from about 40 to about 50% by weight, component 2) is present in the formulation in the amount of about 30 to about 40% by weight, component 3) is present in the formulation in the amount of about 10 to about 30% by weight, and component 4) is present in an amount that comprises the remainder of the formulation up to 100% by weight.

In order to understand the conditions to which the printed film can be subjected during manufacture, distribution and sale, reference is made to the manufacture of sterilized milk pouches using vertical form, fill and seal equipment. However, it will be understood that the present invention may be used in all types of packaging operations where aseptic conditions apply and food material is packaged, regardless of the equipment used.

The vertical form, fill and seal apparatus preferred by the dairy industry is sold under the trade-mark Enhance™ Flexible Aseptic Packaging Systems by DuPont Canada Inc.

Successful aseptic packaging depends on two important operations. Firstly, the packaging material must be sterilized and, secondly, the sterile zone must be maintained while the package is being formed, filled and sealed.

A bath of hot hydrogen peroxide solution is preferred for sterilizing the packaging film. Once the film has been exposed to the bath, it enters a sterile zone where it passes over a forming plate, which folds the material into a tube. The edge of this tube is sealed in a vertica seal unit, and the product is dispensed into the package. The filled package is simultaneously hermetically sealed and cut in a horizontal sealing/cutting unit. The package is then discharged onto a conveyor.

Different sterilization methods may be used in different parts of the apparatus. In the machine itself, a combination of hydrogen peroxide and heated air is preferably used to create the sterile zone, and sterility is maintained by a blanket of incinerated sterile air. Steam is combined with the hydrogen peroxide to sterilize the product supply system.

The size of the package is dependent on the product that is being packaged, but it may vary from small to large, for example, 50 ml up to several litres or more. The advantages of pouch packaging have been well documented in the patent literature, but the advantages may be increased when the pouches themselves contain printed material about the product contained therein, as is possible according to the present invention. Often smaller unprinted pouches are placed in a larger outer bag which contains printed matter about the product. The present invention can eliminate this requirement The requirements of an ink for applying to the surface of polymer films are very much dependent on the manufacturing conditions and the product being packaged. The printed film must endure any converting operations, such as printing, laminating, coating, and slitting into rolls of correct width. Previously, in order to produce printed packages that would be capable of sterilization in a solution of hot hydrogen peroxide, an extra layer of film was applied via a lamination step or extrusion coating to cover and protect the surface of the printed film.

The sterilization processes that may form part of the packaging operation may be selected from steam autoclaving, ozone gas, ethylene oxide gas, reactive chemicals produced by radiation, hydrogen peroxide bath, and combinations thereof. Preferably, the food product is a flowable material and the package is a flexible film pouch.

The food product package containing a food product may be formed from a packaging material during the packaging of the food product, the surface of the packaging material being printed with the ink formulation as described earlier and remaining stable subsequent to its application to the packaging material, and the material and/or printed film and package is subjected to aseptic packaging conditions and is resistant to abrasion during packing, distribution and sale. Again the food product to be packaged may be sterilized, and the food product may be a flowable material and the package, a flexible film pouch or a paper-based laminated rigid package.

In a preferred form of the present process, the ink coated packaging material may have a clear coat applied thereto at the final station of the printing press. This coating is preferably the coating formulation of the invention. Usually this step is employed in the case of a flexible film packaging material to render the package surface more glossy and to increase scuff resistance. This coating is relatively thinner than coatings used previously.

The polymeric films, which may be used in the present invention, are any of those known in the art of packaging. Any film, which is approved for use with foods, may be used as the flexible film in the present invention. In the packaging of flowable materials, many films are employed and the patent literature is filled with information regarding the nature of these films. Reference in this regard may be had to the disclosures of the following patents and published applications: U.S. Pat. No. 5,747,594 issued May 5, 1998 to de Groot et al.; U.S. Pat. No. 5,792,534 issued Aug. 11, 1998 to de Groot et al.; U.S. Pat. No. 5,879,768 issued Mar. 9, 1999 to Falla et al.; U.S. Pat. No. 5,288,531 issued Feb. 22, 1994 to Falla et al.; U.S. Pat. No. 5,360,648 issued Nov. 1, 1994 to Falla et al.; U.S. Pat. No. 5,364,486 issued Nov. 15, 1994 to Falla et al.; U.S. Pat. No. 5,508,051 issued Apr. 16, 1998 to Falla et al.; U.S. Pat. No. 5,721,025 issued Feb. 24, 1998 to Falla et al.; U.S. Pat. No. 4,521,437 issued Jun., 1985 to Storms; U.S. Pat. No. 5,272,236 issued Dec., 1993 to Lai et al.; U.S. Pat. No. 5,278,272 issued Jan., 1994 to Lai et al.; U.S. Pat. No. 4,503,102 issued Mar., 1985 to Mollison; EP 673397A; and WO 99/10430, the disclosures of which are incorporated herein by reference.

The paper-based packaging material may be printed with the inks of the present invention. The inks may be applied to the polymeric layer that covers the outside surface of the paper layer. A clear coat based on the coating formulation of the invention may be applied, when required, but this is not necessary to protect the printed surface. Reference was made earlier to patents that disclose these types of packaging materials and the packages formed therefrom. Examples are found in U.S. Pat. Nos. 4,424,260, 4,416,667 and 4,495,016, the disclosures of which are incorporated herein by reference.

A particularly preferred co-solvent-type polyamide resin is UNI-REZ® 1533, manufactured by Arizona Chemical Company.

When pigments are employed in the formulation of the present invention, a solution of the metal salt of propionic acid, preferably zirconium propionate, is used as an adhesion promoter for the pigment and has been found to be essential to the successful application of the ink to the film when the film is printed under aseptic packaging conditions.

The typical ranges for the components of the ink formulation of the present invention are as follows:

from 10 to about 55 percent by wt. of a nitrocellulose base dispersion;

from about 45 to about 55 percent by wt. of a mixing varnish comprising a non-aqueous solution of a polyamide resin; and from 1 to about 2 percent by wt. of a non-aqueous solution of zirconium propionate additive.

Examples of suitable formulations that lie within these ranges are found subsequently.

The nitrocellulose compound varnish preferably comprises ¼ sec SS nitrocellulose and preferably a mixture of solvents, for example, at least one alcohol and at least one alkyl acetate, together with a fatty amide. Nitrocellulose release varnish is present in the amount of about 15% by weight, and normally this varnish comprises about 30% by weight of compound varnish solution, about 30% by weight ethanol, about 15% by weight n-propyl acetate and about 25% by weight of a fatty amide, preferably a hydrogenated tallowamide. A commercial example of such a tallowamide is ARMID HT® supplied by Akzo Chemicals Inc.

In a preferred formulation of the present invention, the mixing varnish solvent system comprises about 32% by weight of propyl alcohol, about 9.8% by weight aliphatic hydrocarbon, about 9.0% by weight n-propyl acetate, about 4.0% by weight of a synthetic wax which is typically a free flowing powder that aids anti-block, lubricity and abrasion resistance, and from about 15% to about 20% by weight of release varnish. A commercial example of such a product is Shamrock Synthetic Wax, which is a micronized polypropylene wax. In a preferred form, about 0.2% by weight of Dow Corning Silicone Fluid is added for slip and release of the heat sealing jaws typically used in the preferred vertical form, fill and seal packaging process of the present invention.

Preferably, in the ink formulation, the phenolic-modified, co-solvent-type polyamide resin is present in an amount ranging from about 20 to about 35% by weight or more preferably about 30% by weight of the resin. Preferably, the mixing varnish comprises about 45 to about 50% by weight of the overall ink formulation, with the colour concentrate comprising about 25 to about 50% by weight.

A preferred amount of the non-aqueous solution of zirconium propionate may comprise about 1.5% by weight of the formulation. A typical example of such a composition is a 50:50 composition of zirconium propionate and ethanol. Suitable amounts of other metal salts may be selected based on this amount.

The pigment used in the ink formulation of the present invention may be any commercially available pigment approved for use in connection with food, in particular on the outside of a food package. It is most important that the pigment be resistant to hydrogen peroxide, or any other sterilization means, which may be used in packaging food with the printed packaging materials of the present invention.

Typical pigments, which may be used in the formulation of the present invention, are as follows

| | |
|---|---|
| White for example, | Finntitan RDI-S P.W.6; |
| Yellow for example, | Predisol Diarylide Yellow; Yellow P.Y.13; and Sun brite Yellow P.Y.14; |
| Orange for example, | Predisol Orange P.O. 34; |
| Red for example, | Carmine Red P.R.185; and Quindo Magenta P.R.122 |
| Blue for example, | Irgalite Blue P.B.15:4; |
| Green for example, | Phthalo Green P.G.7; |
| Violet for example, | Sunfast Violet P.V.19; and |
| Black for example, | Predisol Black P.B.7. |

Typically the above pigments will be formulated into a colour concentrate by adding them to a solution of ¼ sec nitrocellulose. These dispersions are then blended in various combinations and percentages to a combined total of no higher than about 55% of the total ink formulation or where necessary to the optimum value required to achieve the desired colour intensity.

Preferably the specialty additives may comprise from about 1 to about 3% by weight of the formulation, when present. The plasticizers promote adhesion in the ink formulation. If present in excess, they may cause blocking. Examples of the specialty additives include polyethylene wax and silicone fluid. The sterilization bath comprising hydrogen peroxide employs food grade hydrogen peroxide at a temperature of 50° C. and a concentration of between 30–35 weight percent. Both sides of the film are fully immersed in the peroxide for a period at least about 30 seconds in the process of the present invention.

BRIEF DESCRIPTION OF THE DRAWING

The accompanying FIGURE is meant to illustrate the present invention only and should not be used to limit the scope of the claims.

DESCRIPTION OF PACKAGING PROCESS FOR FLEXIBLE FILM PACKAGING MATERIAL

Figure 1:
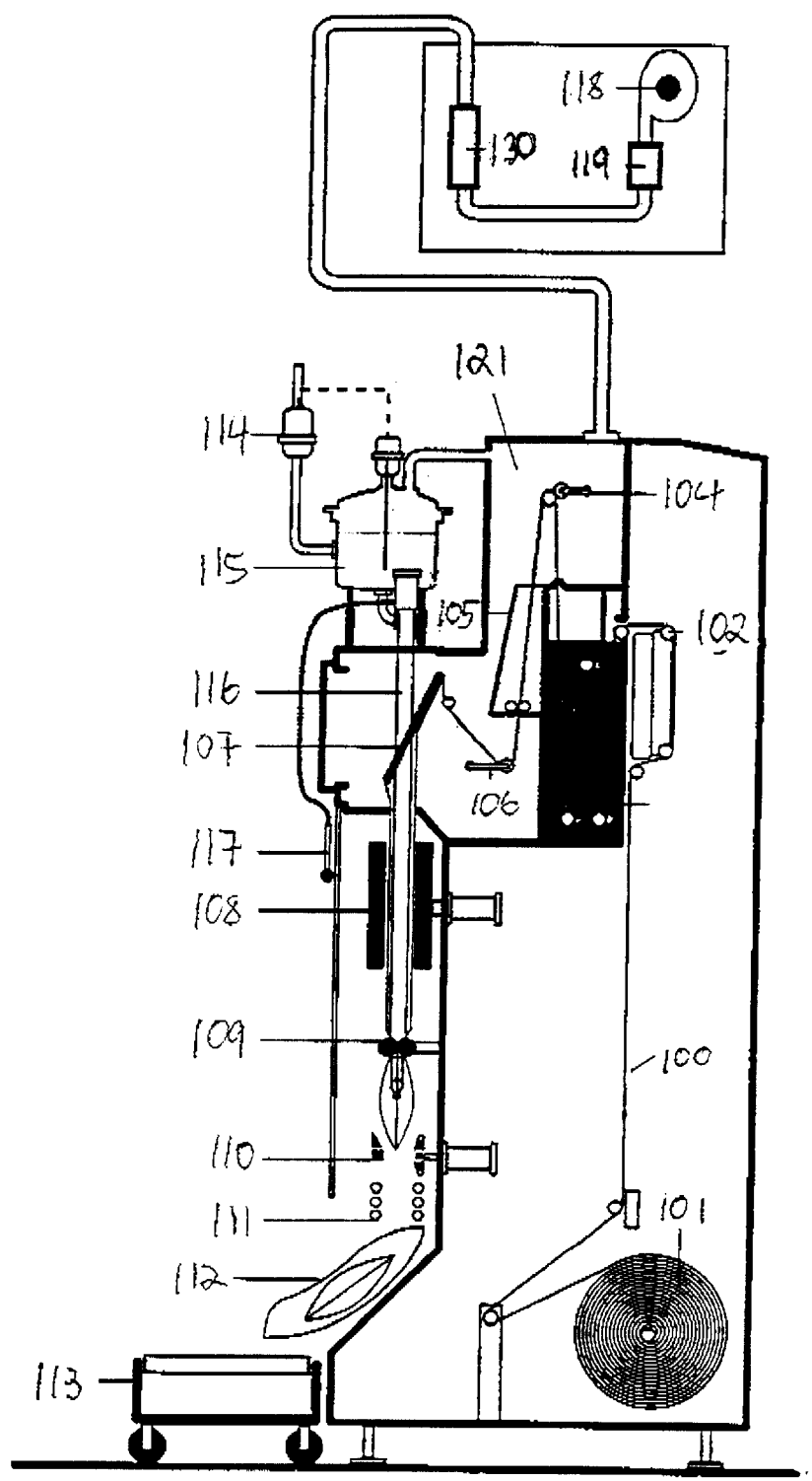
FIG. 1 is a schematic representation of an aseptic packaging process using a vertical form fill and seal pouch-making machine.

Referring now to the FIGURE, there is illustrated in schematic form a packaging film path for aseptic packaging including a product supply and a sterile zone.

The packaging film path comprises a constant tension unwind unit 101 that allows film 100 to be fed via a web alignment guide 102 and auxiliary film drive rollers 104 to a web drying tunnel 105. Constant tension dancer bar 106 applies tension to the film after which it passes over forming plates 107 which forms the film 100 into a tube 100*a*. Vertical seal unit 8 seals the longitudinal edge of the tube, and the product (not shown) is fed into the tube 100*a* above primary film drive rollers 109. A horizontal sealing and cutting unit 110 simultaneously hermetically seals and cuts the filled package 100*b* which drops via package constraint means 111 onto a pouch discharge unit 112 and then onto pouch conveyor 113. The product supply comprises a product throttling valve 114, a product fill bowl 115, a product fill tube 116 and a fill volume adjustment means 117.

The sterile zone 121 comprises an air blower 118, an air incinerator 119, and a sterile air heat exchange 120. A hydrogen peroxide sterilization bath is designated by element 103. The film 100 passes through this bath 103 and remains in the sterile zone 121 until product fill commences.

In the following examples, the application of the ink and coating formulations of the present invention to a flexible film, in this case a polyethylene film is used to illustrate the invention. These examples are for purposes of illustration only and are not to be used to limit the scope of the claims that appear hereafter.

EXAMPLES

In the following Table 1 there are summarized ink formulations made in accordance with the present invention.

TABLE 1

| Ex. No. | Pigment Colour | Nitrocellulose Compound Varnish % by wt. | Mixing Varnish % by wt. | Non-aqueous Solution of Propionic Acid Salt % by wt. |
|---|---|---|---|---|
| 1 | RS Yellow | 50.00 | 48.50 | 1.50 |
| 2 | GS Yellow | 50.00 | 48.50 | 1.50 |
| 3 | Orange | 50.00 | 48.80 | 1.50 |

TABLE 1-continued

| Ex. No. | Pigment Colour | Nitrocellulose Compound Varnish % by wt. | Mixing Varnish % by wt. | Non-aqueous Solution of Propionic Acid Salt % by wt. |
|---|---|---|---|---|
| 4 | Permanent Red | 50.00 | 48.50 | 1.50 |
| 5 | Phthalo Blue | 50.00 | 48.50 | 1.50 |
| 6 | Violet | 50.00 | 49.00 | 1.00 |
| 7 | Phthalo Green | 50.00 | 48.50 | 1.50 |
| 8 | Black | 50.00 | 49.00 | 1.00 |

The following is a breakdown of the various components in the above Table 1.

| Composition Ingredients | % by weight |
|---|---|
| Mixing Varnish | |
| Normal Propyl Alcohol | 32.00 |
| VM & P Naphtha | 9.80 |
| Normal Propyl Acetate | 9.00 |
| Polyamide Resin | 30.00 |
| Polyethylene Wax | 4.00 |
| Nitrocellulose Compound Varnish | 15.00 |
| Silicone Fluid | 0.20 |
| Polyamide Varnish | |
| Polyamide Resin | 40.00 |
| Iso Propyl Alcohol | 48.00 |
| Lactol Spirits | 12.00 |
| Additive | |
| Zirconium Propionate | 50.00 |
| Denatured Ethanol | 50.00 |
| Nitrocellulose Compound Varnish | |
| ¼ sec SS Nitrocellulose | 30.00 |
| Denatured Ethanol | 30.00 |
| Normal Propyl Acetate | 15.00 |
| Fatty Amide (Armid HT ™) | 25.00 |

TABLE 2

Inorganic Pigment Ink Formulation and Coating Formulation

| Ex. No. | Formulation | Nitrocellulose Compound Varnish % by wt. | Mixing Varnish % by wt. | Polyamide Varnish % by wt. | Non-aqueous Solution of Propionic Acid Salt |
|---|---|---|---|---|---|
| 9 | White Pigment | 25.00 | 59.00 | 15.00 | 1.00 |
| 10 | Extender | 55.00 | 45.00 | 0.00 | 0.00 |

The components set out in this Table are the same as those for Table 1, with the exception of the polyamide varnish found in the inorganic white pigment formulation.

The following is a description of the preparatory steps for the components of the ink formulation of the present invention.

Preparation of Nitrocellulose Compound

The nitrocellulose compound was prepared by premixing the following components using high-speed mixer for one hour at 50° C. and then passed through horizontal mill at 50° C. The produce generated from the horizontal mill has Brookfield viscosity of 1000–5000 cps @25° C.

TABLE 3

| Component | Parts |
|---|---|
| Nitrocellulose Solution (28% Solution) | 30.00 |
| Ethanol | 30.00 |
| n-propyl acetate | 15.00 |
| Fatty amide | 25.00 |
| Total | 100.00 |

Preparation of Zirconium Propionate Solution

The zirconium propionate solution was prepared by adding zirconium propionate slowly to ethanol while mixing. The dissolved mixture is a slightly cloudy colourless solution. This solution is required when an ink formulation is prepared.

TABLE 4

| Component | Parts |
|---|---|
| Zirconium Propionate | 50.00 |
| Ethanol | 50.00 |
| Total | 100.00 |

Preparation of Mixing Varnish

The mixing varnish was prepared by, first, dissolving the polyamide resin (Unirez 1533) in the mixture of n-propanol, VM & P naphtha and n-propyl acetate. The polyethylene wax, Shamrock S232 N1 was then dispersed in the polyamide resin solution. Once dispersed, the nitrocellulose compound made above and silicon fluid were added to the mixture and mixed. The final mixture has a viscosity of about 100–200 cps at 25° C.

TABLE 5

| Component | Parts |
|---|---|
| n-propanol | 32.00 |
| VM & P naphtha | 9.80 |
| n-propyl acetate | 9.00 |
| Polyamide resin | 30.00 |
| Polyethylene wax | 4.00 |
| Nitrocellulose compound | 15.0 |
| Silicone fluid | 0.20 |
| Total | 100.00 |

Preparation of Nitrocellulose Compound Varnish Base

The phthalocyanine blue pigment, Irgalite GLVO, was premixed with a mixture of nitrocellulose solution ethanol at 50° C. for one to two hours. When the proper premix viscosity was attained, the pre-mix is passed through a horizontal mill. Once the optimum dispersion is achieved, then the mill will be flushed with ethanol. Viscosity for this base is 300–500 cps.

TABLE 6

| Component | Parts |
| --- | --- |
| (Premix) | |
| Nitrocellulose-Solution (28%) | 56.00 |
| Ethanol | 5.70 |
| Pigment | 19.00 |
| (Letdown) | |
| Ethanol | 10.30 |
| Total | 100.00 |

The following examples illustrate the application of inks to a flexible packaging film.

The following examples describe lab scale tests in which printed flexible packaging film according to the present invention was subjected to oxidizing conditions equivalent at a minimum to those found in aseptic packaging processes.

Experimental Procedure for Lab Scale Tests

A new 1-liter Mason jar was used for each test. An 800-ml aliquot of 35% PERONE™ food grade hydrogen peroxide solution was added to each jar. The concentration of the peroxide solution was measured before the experiment began. A film sample with a known printed surface area was added to each jar except for one film sample, which served as a control.

Films used in these tests were obtained as follows:

Blown Polyethylene Film A was extruded from a linear ethylene-octene copolymer resin, Dowlex 5056™ supplied by Dow Chemical Corp. (melt index at 190C is 1.1 and density is 0.919 g/cc), plus 6% by weight titanium dioxide and minor amounts of additive concentrates (<10% by weight). The 80 μm thick film was corona discharge treated on the outside surface during manufacture to a level of 42 dynes/cm.

Blown Polyethylene Film B was 76 μm thick SM3™PW supplied by DuPont Canada Inc. The film is white and corona discharge treated on the outer surface. Its major component is an ethylene-octene copolymer resin.

Blown Polyethylene Film C was a 3 layer coextrusion which had a sealant layer, a core layer and an exterior layer in the thickness ratio 3:5:2. The film appeared black when viewed from the inside because carbon black was included in the sealant layer resin blend and white when viewed from the outside because titanium dioxide was included in the outer two layers. The sealant layer resin blend included 74% Dowlex 2077D™, a linear ethylene-octene copolymer resin supplied by Dow Chemical Corp. (melt index at 190° C. is 0.85 and density is 0.922 g/cc), 19% Dow 609C, a high pressure low density polyethylene also supplied by Dow Chemical Corp. (melt index at 190° C. is 0.88 and density is 0.924 g/cc) and 7% of a carbon black concentrate. The core and exterior layer resin blends contained 68% Dowlex 2077D™, 17% Dow 609C™, and 15% of a titanium dioxide concentrate. The film was manufactured at a blow up ratio of 2.9:1 so as to be 90 μm thick on average. It was corona discharge treated on the exterior surface.

A plastic cap, with a condenser tube attached to it, was screwed onto each jar, then the jars were immersed up to the neck in a temperature-controlled water bath at 50° C.

Every day, the concentration of the peroxide in each jar was determined. The peroxide solution was poured from the sample jar into a clean 800 ml graduated cylinder, where its temperature and specific gravity could be measured. A standard nomograph was then used to determine the peroxide concentration. After the measurements were taken, the peroxide was poured back into the sample jar and returned to the temperature-controlled bath.

At the end of the experiment, the film samples were removed from the sample jars, washed with demineralized water, air-dried and inspected. Any fading, bleeding or debonding of the ink was noted.

Example 11 (Comparison)

A sample of Polyethylene Film A, printed with a customer logo, was subjected to the lab scale test. The polyethylene film had been corona discharge treated before printing. A logo was printed the film using black, green and red inks, as well as a clear overvarnish from the Sun X solvent-based ink system supplied by Sun Chemical Ltd. and useful for application to polyethylene substrates. The test film had a surface area of 400 square inches, but the percentage of the surface that was printed was estimated to be only 10%.

The peroxide exposed to the printed film decomposed at a rate of 4.83% per day, whereas the control sample of peroxide kept in the same temperature-controlled bath decomposed at a much slower rate of 0.833% per day. This same control was used in Examples 12, 13, 14 and 15.

TABLE 7

| Sample | peroxide decomposition rate |
| --- | --- |
| Printed film | −4.83% per day |
| Control | −0.833% per day |

The Sun X polyamide ink system was judged to be unsuitable for the aseptic film application.

Example 12 (Comparison)

A sample of Polyethylene Film A, corona-treated and printed with a blue pigment from the Sun RB-30 solvent-based, polyurethane-based ink system supplied by Sun Chemical Ltd. as an ink suitable for application to polyethylene film, was subjected to the lab scale test. "Film A" samples were separately printed with each of a red and a black ink, and a clear base varnish from the same RB-30 ink system. Each test film had a printed surface area of approximately 200 square inches.

The film printed with blue ink caused the most dramatic increase in the peroxide decomposition rate. Films printed in clear, red and black inks also caused accelerated peroxide decomposition relative to the control sample. The Sun RB-30 polyurethane ink system was judged to be particularly unsuitable for the aseptic film application because even the base varnish was incompatible with the hydrogen peroxide sterilant.

TABLE 8

| Sample | peroxide decomposition rate |
| --- | --- |
| Blue | −7.50% per day |
| Red | −4.67% per day |
| Black | −3.75% per day |
| Clear coat | −5.00% per day |
| Control | −0.33% per day |

Example 13 (Comparison)

Samples of Polyethylene Film B, corona-treated and printed with various inks from the CONTAX™ F solvent-based ink system supplied by Zeneca Specialty Inks, were subjected to the lab scale test. Each test film had a printed surface area of approximately 100 square inches.

Films printed with each of white and blue inks did cause accelerated peroxide decomposition, whereas films printed with each of magenta and black inks did not. The peroxide also had a dramatic effect on the printing. By the end of the 11-day test, the colour on the white, magenta and black samples had almost entirely disappeared. A white solid could be observed at the bottom of the Mason jar containing the white film sample. The blue ink survived better than the other colours but it was generally faded and had peeled off the film in places.

TABLE 9

| Example Film | Pigment | peroxide decomposition rate | effect on printed sample |
|---|---|---|---|
| 13a | White | −3.9% per day | almost entirely faded |
| 13b | Magenta (red) | same as control | almost entirely faded |
| 13c | Blue | −2.0% per day | some fading & peeling |
| 13d | Black | same as control | almost entirely faded |
| 13e | Control | −0.18% per day | — |

Based on the results of the lab scale test, the CONTAX™ F ink system was judged to be unsuitable for the aseptic film application. The mixing varnish of this ink system did include a phenolic-modified, co-solvent-type polyamide, but not a hydrogenated tallowamide. The pigment dispersions did not include zirconium propionate.

Example 14

Samples of Polyethylene Film B, corona-treated and printed with various inks formulated in accordance with the invention and as set out in the examples in Tables 1 and 2, were subjected to the lab scale test. Each test film had a printed surface area of approximately 100 square inches. Test results are summarized in the Table 10 below.

TABLE 10

| Example | Sample | peroxide decomposition rate | effect on printed sample |
|---|---|---|---|
| 14a | White 1 | −3.68% per day | no apparent change |
| 14b | Black 1 | same as control | ink came off in big chunks and dissolved in the peroxide solution turning it black |
| 14c | Red shade yellow | same as control | no apparent change |
| 14d | Green shade yellow | same as control | no apparent change |
| 14f | Diar. Orange Permanent red | same as control same as control | no apparent change no apparent change |
| 14g | Phthalo blue | −1.13 % per day | no apparent change |
| 14h | Violet 1 | same as control | the colour was bleached to the extent that it had almost disappeared and the peroxide solution was pink |
| 14i | Phthalo green | −0.67% per day | no apparent change |
| 14j | Milori blue | −4.14% per day | the colour was bleached to the extent that it had almost disappeared and the peroxide solution was blue |

TABLE 10-continued

| Example | Sample | peroxide decomposition rate | effect on printed sample |
|---|---|---|---|
| 14k | Rhodamine red | same as control | the colour was bleached to the extent that it had almost disappeared and the peroxide solution was pink |
| 14l | Clear base varnish | same as control | no apparent change |
| 14m | Control | −0.55% per day | |

Example 15

Samples of Polyethylene Film B, corona-treated and printed with additional new inks formulated as described in Tables 1 and 2, were subjected to the lab scale test. Each test film had a printed surface area of approximately 100 square inches. Test results are summarized in the table below:

TABLE 11

| Example | Sample | peroxide decomposition rate | effect on printed sample |
|---|---|---|---|
| 15a | Violet 2 | less than control | no apparent change |
| 15b | Black 2 | less than control | some fading |
| 15c | Black 3 | less than control | some blotching |
| 15d | White 2 | same as control | no apparent change |
| 15e | Control | −0.87% per day | — |

Example 16

The following examples detail full-scale production tests of the present invention.

Experimental Procedure for Full Scale Production Tests

The floor tank of the ENHANCE™ aseptic pouch filler was cleaned and flushed, then filled with a charge of PERONE™ 35% hydrogen peroxide solution. The machine was operated in its normal production mode with the sterile air being maintained at a temperature of 45° C. and the peroxide circulating up to the film sterilization tank at a temperature of 52° C. Water-filled pouches were made on one or both heads of the aseptic pouch filler. During production, the normal contact time of the printed film with peroxide in the sterilization tank was about 30 seconds. The total production time and the number of rolls used each day were recorded. Only one type of film was used during any given day. For the printed films, the scuff resistance of the printed logo was noted. If the printing on the film looked unchanged and there was no sign of accelerated peroxide decomposition, the machine would be stopped with printed film sitting in the peroxide tank for up half an hour.

At the end of the day, the peroxide solution was allowed to drain back into the floor tank. The peroxide heater was turned off and a resistance temperature detector was used to measure the peroxide temperature for several hours. If the temperature was dropping steadily, then the heater was turned back on in preparation for the next day of the experiment. If the temperature was rising, the charge of peroxide was dumped. The film and floor tanks were rinsed thoroughly and a new charge of peroxide would be added.

Example 17 (control)

In a control run, 1 liter pouches were made from 1 roll of clear unprinted polyethylene film for 3 hours, then 1 roll of white unprinted polyethylene film for half an hour, on one head of the ENHANCE™ aseptic pouch filler. The peroxide concentration at the beginning of the day was measured as 34.0% and at the beginning of the next day as 34.1%. The temperature trace that was recorded overnight showed that the peroxide temperature dropped steadily from 55° C. to 42° C. over a period of 12 hours. The peroxide did not appear to be contaminated.

Example 18

Pouches were made on one head of the ENHANCE™ aseptic pouch filler from 2 rolls of Polyethylene Film A printed with Sun RB-30 inks (blue, red, black and a clear overvarnish as in EXAMPLE 2). One-liter pouches were manufactured for a total running time of six hours and 35 minutes. When the peroxide was returned to the floor tank and the heater was turned off, the temperature rose exponentially over the period of 5 hours until it was actually boiling at 100° C. The peroxide solution was obviously highly contaminated and had to be disgarded.

Example 19

Three lots of Polyethylene Film B were printed with inks as set out in Table 12 using inks formulated according to the present invention and as shown in Tables 1 and 2. The ink components used to print the different lots are summarized in the table below. The inks were applied to the film in rectangular bands that were 1" wide and 8.75" long. The individual bands were separated from one another by about 1" of unprinted film and the set of bands was separated from the next set by a 1" gap.

Film lot 19B had clear overvarnish applied on top of the inks. The overvarnish was added as a single block over the whole set of printed bands, extending beyond the outer ones and at the top and bottom by about 2 mm.

TABLE 12

| | Surface Printed Film | |
| --- | --- | --- |
| Example | Pigment | overvarnish |
| 19A | diar. orange permanent red red shade yellow white 2 | no |
| 19B | same as 19A | yes |
| 19C | green shade yellow phthalo blue phthalo green violet 2 | no |

The surface-printed film rolls were made into 1 liter water-filled pouches on the ENHANCE™ aseptic pouch machine. On the first two days, 5 rolls of lot 19A film were run (21900 impressions). On day 3, 4 rolls of lot 19B were run (2 rolls & 2 half rolls, 18000 impressions). This film had clear overvarnish covering the coloured ink bands. On day 4, 6 rolls of 19C were run (4 rolls & 2 part rolls, 29400 impressions).

The following observations could be made.
1. The surface-printed film did not scuff, fade, bleed, discolour or in any other way lose its original appearance in the presence of hot 35% hydrogen peroxide solution. In production mode, the film was only exposed to the peroxide for about 30 seconds; however, stops of over half an hour were included in the test.
2. The inks of the present invention did not cause accelerated peroxide decomposition. In fact, the set of measurements that were taken indicated that the peroxide concentration did not change to a measurable extent throughout the entire 4-day test. The ink system did not contaminate the peroxide tank or the ENHANCE™ aseptic pouch filler in any other observable way.
3. The surface print was quite durable even without an overlacquer.

Example 20

One lot of Polyethylene Film C was printed with inks from inks formulated in accordance with the present invention and as shown in Tables 1 and 2. The inks included the following pigments: Black3, phthalo blue, phthalo green, permanent red, diarylaide orange and green shade yellow. The inks were applied to the film in the form of a customer logo which covered about ⅓ of the film surface.

Two surface-printed film rolls were made into 900 milliliter water-filled pouches on the ENHANCE™ aseptic pouch machine. Both rolls of film were entirely used up. Stops of 20 minutes and 1 hour were included in the test. During the stops, a portion of the film sat in the hot hydrogen peroxide sterilant bath.

The following observations were made.
1. The surface-printed film did not scuff, fade, bleed, discolour or in any other way lose its original appearance in the presence of hot 35% hydrogen peroxide solution.
2. The inks of the present invention did not cause accelerated peroxide decomposition.
3. The surface print was quite durable even without an over lacquer.

While the invention has been described with particular reference to certain embodiments thereof, it will be understood that changes and modifications may be made by those of ordinary skill in the art within the scope and spirit of the following claims.

What is claimed is:

1. A non-aqueous coating formulation compatible with aseptic packaging processes which comprises the following components:
 1) a mixing varnish comprising a phenolic-modified co-solvent-type polyamide resin,
 2) a nitrocellulose compound varnish,
 3) a solvent mixture, and
 4) specialty additives selected from plasticizers and adhesion components, and
wherein all components present in the formulation are stable under aseptic packaging conditions.

2. A coating formulation as claimed in claim 1 wherein component 1) is present in the formulation in the amount of from about 40 to about 50% by weight, component 2) is present in the formulation in the amount of about 30 to about 40% by weight, component 3) is present in the formulation in the amount of about 10 to about 30% by weight, and component 4) is present in an amount that comprises the remainder of the formulation up to 100% by weight.

3. A non-aqueous ink formulation compatible with aseptic packaging processes which comprises the following components:
 1) a mixing varnish comprising a phenolic-modified co-solvent-type polyamide resin,
 2) a nitrocellulose compound varnish,
 3) a solvent mixture,
 4) a solution of a metal salt of propionic acid and
 5) specialty additives selected from plasticizers and adhesion components, and wherein all components present in the formulation are stable under aseptic packaging conditions.

4. An ink formulation as claimed in claim 3 wherein component 1) is present in the formulation in the amount of from about 43 to about 54% by weight, component 2) is present in the formulation in the amount of about 45 to about 55% by weight, component 3) is present in the formulation in the amount of about 10 to about 30% by weight, component 4) is present in the formulation in an amount of from about 1 to 2% by weight and component 5) is present in an amount that comprises the remainder of the formulation up to 100% by weight.

5. A process for manufacturing a coating formulation that is stable when applied to a packaging material surface and remains so when the film is used to package food products under aseptic packaging conditions, which comprises the steps of dissolving at least one phenolic-modified, co-solvent-type polyamide resin in at least one non-aqueous solvent, and combining the above mixture with the following additional components: at least one synthetic wax, at least one slip release agent, at least one nitrocollulose, and one or more specialty additives selected from plasticizers and adhesion promoters.

6. A process for manufacturing an ink formulation that is stable when applied to a packaging material surface and remains so when the material is used to package food products under aseptic packaging conditions, which comprises the step of dissolving at least one phenolic-modified co-solvent type polyamide resin in at least one non-aqueous solvent, combining the above mixture with a nitrocellulose, at least one pigment and a non-aqueous solution of a metal salt of propionic acid, and with at least one synthetic wax, at least one slip release agent, and one or more specialty additives selected from plasticizers and adhesion promoters.

* * * * *